Feb. 8, 1949.  D. J. MILLER  2,461,072
METEOROLOGICAL BALLOON OR SIMILAR ARTICLE
AND METHOD OF MAKING THE SAME
Filed Jan. 27, 1945

Inventor
Donald J. Miller
By Horce S. Woodruff
Atty

Patented Feb. 8, 1949

2,461,072

UNITED STATES PATENT OFFICE 2,461,072

METEOROLOGICAL BALLOON OR SIMILAR ARTICLE AND METHOD OF MAKING THE SAME

Donald J. Miller, Akron, Ohio, assignor to American Anode Inc., Akron, Ohio, a corporation of Delaware Application January 27, 1945, Serial No. 574,915

7 Claims. (Cl. 244—31)

This invention relates to the manufacture of hollow rubber articles, and particularly to hollow rubber articles, such as large meteorological or pilot balloons, which have a relatively large body to neck ratio. The body portion of a pilot balloon is many times larger than the neck portion thereof, such that, when made as a unit, it is difficult or impossible to remove the article from its forming member by stretching the relatively narrow neck portion of the article to pass over the relatively larger body portion of the forming member.

Hollow rubber articles of this character may be made by dipping a forming member in a rubber dispersion or by molding the article about a mandrel. In either case, to strip the article from its forming member, it is necessary to stretch the relatively narrow neck portion of the article as aforesaid. Unvulcanized rubber, whether natural or synthetic, has relatively little elasticity and will not recover when stretched to a great extent. Vulcanized rubber, both natural and synthetic, has a critical elongation, past which further stretching will permanently deform the article and result in deterioration of tensile strength and elasticity. Therefore, it has been necessary to eliminate excessive stretching by making the hollow rubber articles in sections which can be assembled into a composite article.

A method heretofore proposed for making composite hollow rubber articles is to preform the body portion by a dipping operation and, before proceeding with subsequent steps, withdrawing the forming member from said body portion. Thereafter, an auxiliary, more easily removable, forming member is inserted into the body portion and a neck forming deposit of rubber is produced by a second dipping operation. However, this method consumes much time and labor. With larger articles such as the meteorological balloons mentioned above, much difficulty is encountered in supporting and handling such large articles in the second dipping operation.

An object of the present invention, accordingly, is to provide a process of manufacturing large balloons and similar hollow rubber articles that will reduce the complexity and number of steps necessary to produce the finished article and will make possible the economical and efficient production of hollow rubber articles having substantially larger body to neck ratios. The invention also aims to provide improved and simplified structures in balloons and other products of the character indicated.

Many uses to which hollow rubber articles are put raise no objection to a seam-joint if such joint is inconspicuously placed and neatly made. Therefore, a more specific object of this invention is to provide a new method of manufacturing hollow rubber articles by building up a composite article from preformed parts or portions joined together by neat seam joints.

In the invention, I first produce, preferably by a dipping method, a hollow rubber body member having a large cross-sectional dimension and a smaller neck, the neck aperture, however, being large enough to permit ready stripping of the form on which the member is produced and substantially larger than is permissible or desirable in the finished product. I next produce an auxiliary tubular member of rubber and permanently secure the auxiliary member to the neck of the body member by bringing correspondingly-sized portions of the two members into overlapping or telescoping relation and adhering them together either in a flat or rolled state. The auxiliary tubular member desirably has a generally tapered configuration ending in an aperture of relatively small cross-section to provide a tube of the desired small size for inflation or other purposes.

The preformed members of the hollow rubber article may be made in any convenient way as by dipping into a rubber latex a suitably shaped form having a coating of coagulant on its surface. In making the various parts of the article, care must be taken to make the individual members of the article in such a manner that each part has an aperture large enough therein to permit easy stripping of that part from its forming member and that sufficient extra material is provided to make the seam-joint. It is sometimes advantageous to mold the separate parts of the article from solid rubber but it will usually be found more desirable to manufacture such articles by a dipping process.

The invention will now be described in greater detail with reference to the accompanying drawings illustrating the manufacture of extremely large meteorological balloons such as those having an envelope of from 4 to 15 feet in diameter in the deflated state. It is not to be understood, however, that the invention is limited to the manufacture of balloons, for the method is also applicable to the manufacture of such products as inflatable dolls and other toys as well as molded articles such as certain hot water bottles, syringes, and the like.

Of the accompanying drawings.

Figure 1:
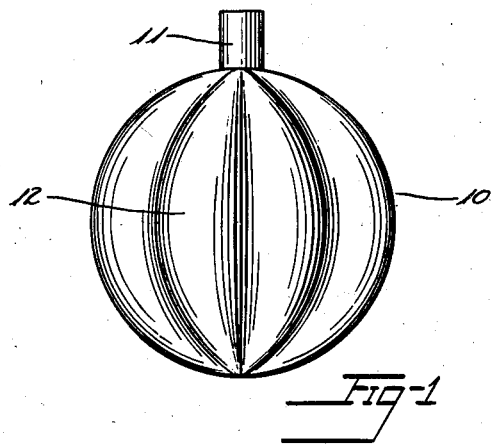
Fig. 1 is an elevation of a preformed envelope or body member of a large meteorological balloon.
Figure 2:
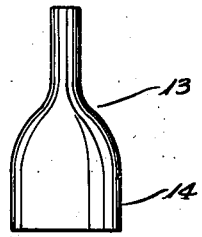
Fig. 2 is an elevation of a preformed auxiliary inflation tube member for the balloon of Fig. 1.
Figure 3:
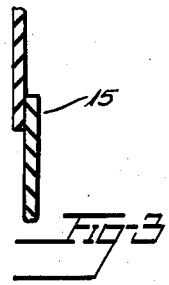
Fig. 3 is a sectional elevation illustrating a type of lap-joint which may be used in the practice of the present invention.
Figure 4:
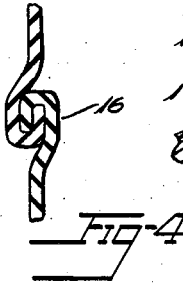
Fig. 4 is a sectional elevation illustrating a type of rolled lap-joint, which is the preferred type of joint to be used in the practice of the invention.
Figure 5:
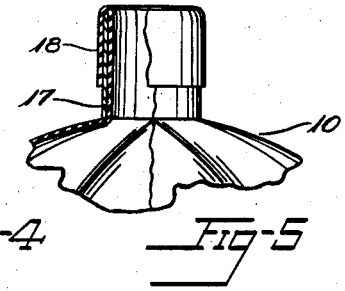
Fig. 5 is an elevation, partially sectioned and broken away, showing the preformed body member of Fig. 1 with the neck drawn through and lapped back over the outside of a supporting ring or cylinder.
Figure 6:
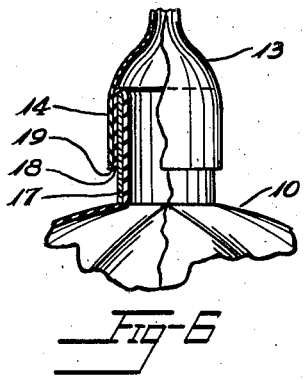
Fig. 6 is an elevation, partially broken away and sectioned, showing the assembly of Fig. 5 with the auxiliary inflation tube member of Fig. 2 in place preparatory to rolling the joint.
Figure 7:
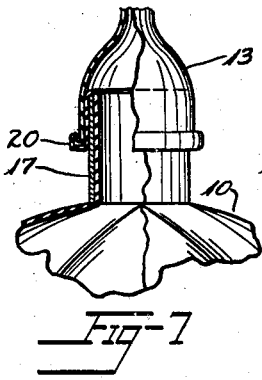
Fig. 7 is an elevation, similarly sectioned, showing the finished assembly with a rolled-back type of rolled lap-joint in place over the ring.
Figure 8:
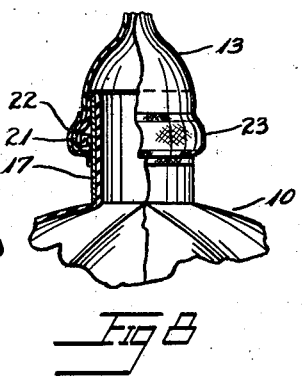
Fig. 8 is an elevation, partially sectioned and broken away, showing an assembly with a binding tape over the joint, and showing in torn-out section the rolled under type of lap-joint.

The body member 10 of a large meteorological balloon is made in any convenient way as by dipping a correspondingly shaped form (not shown) first in coagulant and then into a latex or other rubber dispersion in the usual way and is made such that its constricted neck 11 is large enough to be capable of being distended sufficiently to pass over a diameter 12 taken at the middle of the article itself. A preformed auxiliary tubular neck member 13 of rubber is made in a similar way. Preformed members 10 and 13 may be joined by a straight lap-joint 15 or the preferred rolled lap-joint 16. These latter joints are made by drawing the neck 11 through a supporting ring 17 and lapping the edge of said neck back over the outside of the ring, as at 18. A rubber cement, or other suitable adhesive, is applied to the lapped back surface 18 and the auxiliary inflation tube member 13 is put in place thereover, forming a cemented interface as at 19. The adhered surfaces 14, 18 are rolled in the opposite direction to the first lap to form a rolled lap-joint as at 21 which is the reverse of 20.

Figure 9:
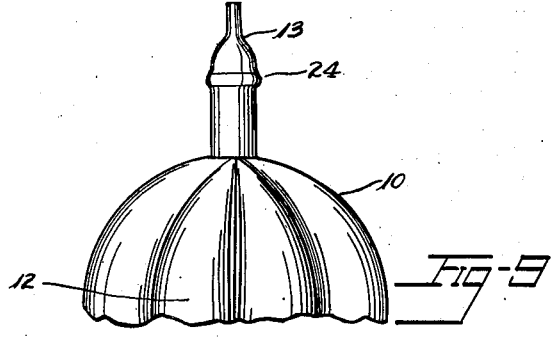
Fig. 9 is a fragmentary elevation of the finished meteorological balloon showing the balloon with a small inflation tube rolled into it.

To vulcanize the body and inflation tube members into an integral balloon, a cloth or rubber tape 22 is secured about the rolled lap-joint 21 so that the cemented surfaces form a tight bond. The tape 22 illustrated may be a plain fabric tape of about one-half inch width. The taped assembly 23, comprising the entire body and neck members of the balloon, with the supporting ring 17 still in place is vulcanized by heating in a hot-air oven or other suitable heating means. The tape 22 and supporting ring 17 then are removed and the article is trimmed and cleaned to produce the finished balloon 24 shown in Fig. 9.

The ring 17 is advantageously made of a metal, preferably of aluminum for its better heat conduction properties. An aluminum ring inside the rolled lap-joint aids in attaining substantially the same temperature inside the joint as that existing outside thereof during vulcanization.

The meteorological balloon of the present invention may be made of natural or synthetic rubber of the common types. Natural rubber or neoprene (polymerized chloro-2 butadiene-1,3) are preferred, however, for these materials have superior elastic and tensile properties.

In the practice of the present invention the tape used to bind the lap-joint about the ring may either be of rubber or cloth. Cloth tape of one-half to one inch in width has been found entirely satisfactory. A cord wound many times about the joint will also serve very well to hold the surfaces of the joint in close contact.

It is possible to make variations and modifications in the method, apparatus and product herein described without departing from the true spirit and scope of the invention as defined in the appended claims.

I claim:

1. In the manufacture of a rubber meteorological balloon or similar thin-walled hollow rubber article having a body dimension so large as to require an aperture for form removal larger than is desired in the inflation tube of the finished balloon, the method which comprises producing an integral seamless rubber hollow body-member so thin-walled as to be unable to retain its shape without inflation and having a neck aperture of sufficient size therein to permit ready stripping from a form of corresponding shape, producing an integral seamless but flexible inflation tube member having one end of generally the same size as the neck of the body member, the other end thereof being of smaller size, inserting the neck of the body member through a tubular supporting ring and doubling the end of said neck back over the outside of the ring, bringing the inside edge of the larger end of the inflation tube in cemented contact with the outside of the doubled end of the body-member, and rolling the cemented surfaces to form a rolled lap-joint.

2. In the manufacture of a rubber meteorological balloon or similar thin-walled hollow rubber article having a body dimension so large as to require an aperture for form removal larger than is desired in the inflation tube of the finished balloon, the method which comprises producing an integral seamless hollow rubber body-member so thin-walled as to be unable to retain its shape without inflation and having a neck with an aperture therein of sufficient size to permit ready stripping from a form of corresponding shape, producing an integral seamless but flexible rubber inflation tube member having one end of generally the same size as the neck of the body-member, the other end thereof being of a smaller size, associating the correspondingly sized ends of the several members by mounting one member on a supporting ring, doubling the end of said member back over the outside of the ring, cementing the correspondingly-sized end of the second member to the outside of the doubled end of the first member and rolling the cemented ends to form a rolled lap-joint.

3. In the manufacture of a hollow rubber article having an apertured neck and a body dimension so large as to require an aperture for form removal larger than is desired in the neck of the finished article, the method which comprises producing an integral seamless thin-walled hollow rubber body-member having a neck with an aperture therein of sufficient size to permit ready stripping from a form of corresponding shape, producing an integral seamless but flexible rubber inflation tube member having one end of generally the same size as the neck of the body-member, the other end thereof being of smaller size, and associating the correspondingly-sized ends of the several members by inserting one within the other in adhesive relation and rolling to form a rolled lap-joint.

4. In the manufacture of an inflatable hollow rubber article having an inflating tube and a body dimension so large as to require an aperture for form removal larger than is desired in the inflating tube of the finished article, the method which comprises producing an integral seamless thin-walled hollow rubber body-member having a neck with an aperture therein of sufficient size to permit ready stripping from a form of corresponding shape, producing an integral seamless but flexible rubber inflating tube member having one end of generally the same size as the aperture of the body member, the other end thereof being of a smaller size, associating the correspondingly-sized ends of the several members by mounting one member on a supporting ring, doubling the end of said member back over the outside of the aforesaid ring, cementing the inside of the correspondingly-sized end of the second member about the doubled end of the first member to form a lap-joint.

5. In the manufacture of an inflatable hollow rubber article having an inflating tube and a body dimension so large as to require an aperture for form removal larger than is desired in the finished article, the method which comprises, producing an integral seamless thin-walled hollow rubber body-member having an aperture of sufficient size therein to permit ready stripping from a form of corresponding shape, producing an integral seamless but flexible rubber inflation tube-member having an end of generally the same size as the aperture of the body-member the other end thereof being of a smaller size, and bringing the two correspondingly-sized portions of the several members into sealing relation.

6. A rubber meteorological balloon or similar hollow rubber article comprising a body-member and an auxiliary inflation tube member, the body-member comprising an integral seamless thin-walled rubber balloon envelope of relatively large cross-sectional dimension terminating in an integral seamless tubular neck of a substantially smaller cross-sectional dimension but permissive of form removal, the auxiliary inflating tube member comprising a one-piece seamless tubular rubber member having one end of substantially the same cross-sectional dimension as the neck of the body-member and the other end thereof of a smaller dimension, the correspondingly-sized ends of the two members being joined in rolled adhesive relation, the smaller end of the inflating tube member extending in an outward direction away from said body-member.

7. A rubber meteorological balloon or similar hollow rubber article comprising two separate members having tubular portions joined together, one of said members being an integral, seamless, hollow rubber body having a relatively large cross-sectional dimension and an integral seamless tubular neck of a substantially smaller cross-sectional dimension but permissive of form removal, the other of said members having on one end a tubular cross-sectional dimension of generally the same size as the neck portion of the body member, the correspondingly-sized portions of the two members being joined in a rolled lap-joint, the second said member extending in an outward direction away from the neck of said body-member.

DONALD J. MILLER

REFERENCES CITED

The following references are of record in the file of this patent:

UNITED STATES PATENTS

| Number | Name | Date |
|---|---|---|
| 212,939 | Ingram | Mar. 4, 1879 |
| 338,068 | Hawley | Mar. 16, 1886 |
| 1,553,340 | Upson | Sept. 15, 1925 |
| 1,620,245 | Turner | Mar. 8, 1927 |

FOREIGN PATENTS

| Number | Country | Date |
|---|---|---|
| 1,159 | France | Mar. 10, 1903 |

(Addition to 319,409)